United States Patent
Huang et al.

(10) Patent No.: US 11,879,175 B2
(45) Date of Patent: Jan. 23, 2024

(54) W18O49/COO/COWO4/NF SELF-SUPPORTING ELECTROCATALYTIC MATERIAL AND PREPARATION METHOD THEREOF

(71) Applicant: SHAANXI UNIVERSITY OF SCIENCE & TECHNOLOGY, Shaanxi (CN)

(72) Inventors: Jianfeng Huang, Xi'an (CN); Guojuan Hai, Xi'an (CN); Liyun Cao, Xi'an (CN); Liangliang Feng, Xi'an (CN)

(73) Assignee: SHAANXI UNIVERSITY OF SCIENCE & TECHNOLOGY, Shaanxi (CN)

( * ) Notice: Subject to any disclaimer, the term of this patent is extended or adjusted under 35 U.S.C. 154(b) by 344 days.

(21) Appl. No.: 17/451,098

(22) Filed: Oct. 15, 2021

(65) Prior Publication Data
US 2022/0127735 A1    Apr. 28, 2022

(30) Foreign Application Priority Data
Oct. 22, 2020 (CN) .......................... 202011139034.0

(51) Int. Cl.
| | |
|---|---|
| C23C 18/12 | (2006.01) |
| C25B 11/054 | (2021.01) |
| C25B 1/04 | (2021.01) |
| C25B 11/091 | (2021.01) |
| C25B 11/061 | (2021.01) |

(52) U.S. Cl.
CPC ........ *C25B 11/054* (2021.01); *C23C 18/1216* (2013.01); *C23C 18/1241* (2013.01); *C23C 18/1283* (2013.01); *C23C 18/1295* (2013.01); *C25B 1/04* (2013.01); *C25B 11/061* (2021.01); *C25B 11/091* (2021.01)

(58) Field of Classification Search
CPC ............ C23C 18/1216; C23C 18/1241; C23C 18/1283; C23C 18/1295
See application file for complete search history.

(56) References Cited

FOREIGN PATENT DOCUMENTS

CN    109806902 A    *    5/2019

OTHER PUBLICATIONS

English translation of CN-109806902-A. (Year: 2023).*

* cited by examiner

*Primary Examiner* — Hai Y Zhang
(74) *Attorney, Agent, or Firm* — Alleman Hall Creasman & Tuttle LLP (57) ABSTRACT

The present disclosure relates to a $W_{18}O_{49}$/COO/CoWO$_4$/NF self-supporting electrocatalytic material and a preparation method thereof, the $W_{18}O_{49}$/CoO/CoWO$_4$/NF self-supporting electrocatalytic material comprising: a foamed nickel substrate and a $W_{18}O_{49}$/CoO/CoWO$_4$ composite material formed in-situ on a foamed nickel substrate. Preferably, the $W_{18}O_{49}$/CoO/CoWO$_4$ composite material is CoO/CoWO$_4$ composite nanosheets and $W_{18}O_{49}$ nanowires distributed among the CoO/CoWO$_4$ composite nanosheets.

12 Claims, 9 Drawing Sheets

$W_{18}O_{49}/CoO/CoWO_4/NF$ SELF-SUPPORTING ELECTROCATALYTIC MATERIAL AND PREPARATION METHOD THEREOF

TECHNICAL FIELD

The present disclosure relates to a $W_{18}O_{49}/CoO/CoWO_4/$NF self-supporting electrocatalytic material and a preparation method thereof, which belongs to the technical field of composite materials.

BACKGROUND

Hydrogen is used as a new chemical energy carrier that is easy to store and convert, and has many advantages such as cleanliness, zero carbon emissions, and environmental friendliness. As we all know, water electrolysis is the basic strategy for producing hydrogen. So far, although some precious metal (such as platinum) catalysts have proven to have high catalytic activity, their scarcity and high cost have prevented their large-scale practical application. Therefore, the development of non-noble metal catalysts is particularly important. Metal oxides, metal sulfides, metal borides, metal phosphides, metal carbides, and metal selenides are currently typical candidates for water-splitting electrocatalysts. The electrolysis process of water involves two half-reactions: oxygen evolution reactions (OER) and hydrogen evolution reactions (HER). These two processes are critical to the overall efficiency of water splitting.

Tungsten oxide ($WO_{3-x}$), is abundant in the earth's crust, and in particular, monoclinic system $W_{18}O_{49}$, which has a large number of surface oxygen vacancies, has received extensive attention in electrochemical applications. The $W_{18}O_{49}$ material with abundant oxygen vacancies can significantly improve the adsorption capacity and the kinetics of hydrogen evolution for H·. Oxygen defects in metal oxides as active sites can improve conductivity and facilitate the adsorption and desorption of water molecules or intermediate reaction substances (for example, H in HER; OH and OOH in OER), thereby further illustrating that $W_{18}O_{49}$ can be a promising material as an electrocatalyst. In addition, in order to avoid the influence of the binder on the conductivity and active area of the catalyst during the preparation of the working electrode, the direct synthesis of the $W_{18}O_{49}$ nanostructured catalyst on the conductive substrate can effectively improve the electrocatalytic performance. Nickel, which has a high abundance and a low price, has attracted widespread attention as a material support system due to its large specific surface area, high electronic conductivity, and ideal 3D opening pore structure. However, density functional theory calculations show that the theoretical overpotential (relative to the reversible hydrogen electrode (RHE)) of the structurally stable $W_{18}O_{49}$ is greater than 0.50 eV, which means that the overpotential of HER is relatively large. Therefore, the electronic structure of $W_{18}O_{49}$ is adjusted by adjusting the process means such as doping, compounding and the like, which is beneficial for improving its electrocatalytic activity.

Cobalt (Co) belongs to the fourth period and group VIII of the periodic table of elements, its common valence states include +2 valence and +3 valence, and its chemical properties are relatively stable. Current studies have shown that cobalt oxides exhibit better catalytic performance and are widely used as bifunctional catalysts, and have good application prospects in the field of catalysis. Among the tungstates, cobalt tungstate ($CoWO_4$) is the OER catalyst which is currently found to have a low overpotential, 0.4 V overpotential at a current density of 1 mA cm$^{-2}$. However, at present, the hydrogen and oxygen production performance of Co oxide and tungstate materials as bifunctional electrocatalytic materials still needs to be further improved.

SUMMARY

In view of the above problems, the present disclosure aims to provide a new high-efficiency dual-function $W_{18}O_{49}/CoO/CoWO4/NF$ self-supporting electrocatalytic material and a preparation method thereof. The prepared synthesized $W_{18}O_{49}/CoO/CoWO4/NF$ electrocatalytic material has a controllable structure and shows better hydrogen production and oxygen production electrocatalytic performance in alkaline solution.

In one aspect, the present invention provides a $W_{18}O_{49}/CoO/CoWO_4/NF$ self-supporting electrocatalytic material, wherein the $W_{18}O_{49}/COO/CoWO_4NF$ self-supporting electrocatalytic material comprises: a foamed nickel substrate and a $W_{18}O_{49}/CoO/CoWO_4$ composite material formed in-situ on the foamed nickel substrate. Preferably, the $W_{18}O_{49}/CoO/CoWO_4$ composite material is $CoO/CoWO_4$ composite nanosheets and $W_{18}O_{49}$ nanowires distributed among the $CoO/CoWO_4$ composite nanosheets.

In the present disclosure, the $W_{18}O_{49}$ and Co oxide with rich oxygen defects are compounded with tungstate for the first time, and directly grow on the foamed nickel substrate by a multi-step method, so that the influence of the binder on the conductivity and activity of the catalyst during the preparation of the working electrode is avoided, and the hydrogen production and oxygen production electrocatalysis performance of the product can be effectively improved.

Preferably, a total loading amount of the $W_{18}O_{49}/CoO/CoWO_4$ composite material on the foamed nickel is 0.5 to 4 mg/cm$^2$. If the loading amount is too small, the product loading on the foamed nickel is less, and the catalytic ability is reduced; when the loading amount is too large, the product easily falls off from the foamed nickel during the electrocatalytic process, and the electrocatalytic stability is influenced. Therefore, too high or too low of a loading amount is not beneficial to the improvement in the catalytic performance in the electrocatalytic process.

Preferably, in the present disclosure, the precursor-grown foamed nickel is prepared by a solvothermal method, and is calcined in a nitrogen atmosphere at 400 to 500° C. to prepare $W_{18}O_{49}/CoO/CoWO_4$ composite material consisting of $W_{18}O_{49}$, CoO and CoWO4. Preferably, the $W_{18}O_{49}/CoO/CoWO_4$ composite material is $CoO/CoWO_4$ composite nanosheets and $W_{18}O_{49}$ nanowires distributed (intercalated) among the $CoO/CoWO_4$ composite nanosheets. In a preferred embodiment, the thickness of the $CoO/CoWO_4$ composite nanosheets is less than or equal to 100 nm, the diameter of the $W_{18}O_{49}$ nanowires is 5 to 20 nm (more preferably 5 to 10 nm), and the length of the nanowires is less than or equal to 100 nm.

Preferably, the molar ratio of $W_{18}O_{49}$, $CoWO_4$ and CoO in the $W_{18}O_{49}/CoO/CoWO_4$ composite material is (0.05 to 0.25):(1.5 to 4):1.

In another aspect, the present disclosure provides a preparation method of the $W_{18}O_{49}/CoO/CoWO_4/NF$ self-supporting electrocatalytic material comprising:

(1) dissolving $CoWO_4$ and $WCl_6$ in a solvent to obtain a first solution;

(2) immersing the foamed nickel in an autoclave containing the first solution, and then reacting at 120 to 200° C. for 3 to 36 hours, taking out the foamed nickel, washing, and drying to obtain the foamed nickel with a precursor growing thereon; and (3) calcining the foamed nickel with the precursor grown at 400 to 500° C. in a nitrogen atmosphere to obtain the $W_{18}O_{49}$/CoO/CoWO$_4$/NF self-supporting electrocatalytic material.

In the present disclosure, CoWO$_4$ and WCl$_6$ are dissolved in absolute ethanol, then react at 120 to 200° C. for 3 to 36 hours, and then are washed and dried. Finally, the obtained product is calcined in a nitrogen atmosphere at 400 to 500° C. to finally obtain the $W_{18}O_{49}$/CoO/CoWO$_4$/NF self-supporting electrocatalytic material. When calcining in a nitrogen atmosphere, on one hand, partial Co salt in the precursor obtained during the solvothermal reaction process can be promoted to be calcined to form CoO; on the other hand, the oxidation of non-chemical tungsten oxide can be prevented. In addition, the precursor is more prone to producing defects during the calcination process in the nitrogen atmosphere, and these defects can be used as active sites of the electrocatalytic material to improve the catalytic activity of the material.

Preferably, the concentration of CoWO$_4$ in the first solution is 0.01 to 5 mol/L, and the concentration of WCl$_6$ in the first solution is 0.01 to 5 mol/L; more preferably, the molar ratio of CoWO$_4$ and WCl$_6$ is (0.2 to 1):1.

Preferably, the preparation method of CoWO$_4$ comprises:
(1) dissolving a tungsten source and a cobalt source with a molar ratio of (0.1 to 3):1 in water to obtain a second solution;
(2) reacting the second solution at 150 to 200° C. for 5 to 36 hours, and then centrifuging, washing and drying to obtain a powder;
(3) calcining the powder at 400 to 500° C. to obtain the CoWO$_4$.

Also, preferably, the tungsten source is selected from at least one of sodium tungstate, ammonium tungstate and tungsten isopropoxide, and the cobalt source is selected from at least one of cobalt chloride, cobalt nitrate, cobalt oxalate, and cobalt acetate.

Also, preferably, the molar ratio of the tungsten source to the cobalt source is (1 to 3):1.

Preferably, the volume filling ratio of the autoclave containing the first solution is 20 to 70%.

Preferably, the temperature rise rate of the calcination is 2 to 5° C./min, and the calcining time is 1 to 4 hours.

Beneficial Effects (1) The $W_{18}O_{49}$/CoO/CoWO$_4$ composite material is synthesized by a wet chemical method and a solid phase sintering method, and the composite material directly grows in situ on the foamed nickel substrate;
(2) the reaction conditions of the present invention are mild and easy to realize, and the process is easy to control;
(3) by controlling the content of each precursor, the content of additives, reaction temperature, reaction time, etc., the $W_{18}O_{49}$/CoO/CoWO$_4$ composite materials with different morphologies can be obtained;
(4) The $W_{18}O_{49}$/CoO/CoWO$_4$/NF electrocatalytic material prepared by the present disclosure exhibits better electrocatalytic hydrogen production and oxygen production performance in alkaline electrolyte.

DETAILED DESCRIPTION

The present disclosure will be further described below through the following embodiments. It should be understood that the following embodiments are only used to illustrate the present invention, not to limit the present invention.

In the present disclosure, a $W_{18}O_{49}$/CoO/CoWO$_4$/NF self-supporting electrocatalytic material with high efficiency and dual functions is synthesized by adopting a multi-step method of "wet chemical method and solid phase sintering method." Firstly, preparing cobalt tungstate, and then in the solvothermal process, alcoholysis is carried out on the tungsten salt added twice during the solvothermal process, and its by-product is HCl, so that part of the Co ions are combined with Cl ions, and a small amount of new cobalt salt is formed when $W_{18}O_{49}$ grows on the foamed nickel, after the solvothermal reaction is completed, the calcination is carried out at high temperature, so that part of the Co salt in the precursor obtained during the solvothermal reaction is promoted to form CoO, and so the $W_{18}O_{49}$/CoO/CoWO$_4$/NF self-supporting electrocatalytic material with high efficiency dual-functions can be synthesized. Ethanol is used as a solvent, tungsten hexachloride is used as a tungsten source, and the reaction formula is as follows:

$$WCl_6 + C_2H_5OH \rightarrow WCl_6(OC_2H_5)_n + HCl$$

The following exemplarily describes the preparation method of the $W_{18}O_{49}$/CoO/CoWO$_4$/NF self-supporting electrocatalytic material provided by the present disclosure.

Cleaning of Foamed Nickel Substrates

For example, take a 50 mL beaker, and completely immerse the foamed nickel with the length-width ratio of (1 to 7):1 in acetone, 3 to 6 mol/L HCl solution, deionized water, and absolute ethanol in sequence, and take ultrasonic treatment for 15 to 30 minutes respectively.

Add analytically pure sodium tungstate serving as a tungsten source into deionized water, and stirring for 20 to 60 minutes to form a uniformly mixed solution A. Among them, in addition to sodium tungstate, the tungsten source can also be selected from ammonium tungstate and tungsten isopropoxide. The concentration of the tungsten source in solution A can be 0.01 to 5 mol/L.

Add cobalt chloride serving as a cobalt source into deionized water, and stirring for 20 to 60 minutes to form a uniformly mixed solution B. Among them, the cobalt source can be selected from cobalt nitrate, cobalt oxalate, and cobalt acetate in addition to cobalt chloride hexahydrate. The concentration of the cobalt source in the solution B can be 0.01 to 5 mol/L.

Drain the solution B into the solution A under stirring to obtain a uniformly mixed solution C. The stirring can be magnetic stirring, manual stirring, and so on. As an example, the solution B is drained into the solution A under the action of magnetic stirring, and the magnetic stirring continues for 20 to 60 minutes to obtain a uniformly mixed solution C.

Fill the solution C into a polytetrafluoroethylene-lined autoclave and seal. Preferably, the volume filling ratio is kept between 20% and 70%.

Put the sealed reaction kettle into a homogeneous hydrothermal reactor for reaction. Among them, the reaction temperature can be 150 to 200° C., and the reaction time can be 5 to 36 hours.

Cool to room temperature after the reaction is completed, and wash and dry the final reactant after the reaction to obtain a powder D. The washing may comprise: washing with absolute ethanol and deionized water 3 to 5 times respectively. Then put the centrifuged material into a vacuum oven at 50 to 70° C. for drying for 5 to 8 hours, or dry in a freeze drying oven at −30 to −60° C. for 5 to 8 hours.

Grind the powder D in a mortar, and then put the powder D into a muffle furnace for calcining. The cobalt tungstate precursor obtained by solvothermal reaction has low crystallinity, and $CoWO_4$ with good crystallinity can be obtained by calcination. For example, the calcination temperature can be 400 to 500° C., and the calcination time can be 1 to 4 hours (for example, 1 to 3 hours). Preferably, the heating rate of the calcination may be 2 to 5° C./min.

$CoWO_4$ and $WCl_6$ are sequentially added to the solvent, and mixed homogeneously to obtain solution E. The solvent can be at least one of absolute ethanol, isopropanol, ethylene glycol and the like. The concentration of $CoWO_4$ in the solution E can be 0.01 to 5 mol/L. The concentration of $WCl_6$ in the solution E can be 0.01 to 5 mol/L. As an example, $CoWO_4$ and $WCl_6$ are sequentially added to 20 to 60 mL of solvent and stirred for 30 to 40 minutes to form a uniformly mixed solution E.

Pour the solution E into a 100 ml polytetrafluoroethylene lined autoclave, and preferably maintain the volume filling ratio between 20 and 70%.

Put the foamed nickel substrate or the cleaned foamed nickel substrate into a polytetrafluoroethylene reactor containing the E solution, and seal.

Put the sealed high-pressure reactor into a homogeneous hydrothermal reactor for reaction to obtain a foamed nickel with precursors. For example, the temperature set for the reaction can be 120 to 200° C., and the reaction time can be 3 to 36 hours.

Cool to room temperature after the reaction is completed, and wash and dry the foamed nickel with the precursor. The washing comprises: washing with absolute ethanol and deionized water 3 to 5 times respectively. For example, the drying comprises: drying the mixture in a vacuum drying oven at 50 to 70° C. for 3 to 10 hours, or drying the mixture in a freeze drying oven at −30 to −60° C. for 3 to 10 hours.

Put the foamed nickel with the precursor into a porcelain boat, and calcine the foamed nickel in a nitrogen atmosphere to obtain $W_{18}O_{49}/CoO/CoWO_4/NF$. For example, the calcining temperature can be 400 to 500° C., and the calcining time can be 1 to 4 hours. Preferably, the temperature rise rate of the calcination can be 2 to 5° C./min.

In the present disclosure, the obtained $W_{18}O_{49}/CoO/CoWO_4/NF$ self-supporting electrocatalytic material comprises: a foamed nickel substrate and a $W_{18}O_{49}/CoO/CoWO_4$ composite material formed in situ in the foamed nickel substrate. The composite material has a variety of microscopic morphologies. Furthermore, the loading amount of the $W_{18}O_{49}/CoO/CoWO_4$ composite material on the foamed nickel is 0.5 to 4 mg/cm$^2$ through inductively coupled plasma (ICP) test. More preferably, the molar ratio of $W_{18}O_{49}$, $CoWO_4$ and CoO in the $W_{18}O_{49}/CoO/CoWO_4$ composite material may be preferably (0.15 to 0.25):(1.5 to 4): 1.

Hereinafter, the present disclosure will be further described with the following examples. It should be understood that the following examples are used to explain this invention but do not mean to limit the scope of this invention. Any non-essential improvements and modifications made by a person skilled in the art based on this invention all fall into the protection scope of this invention. The specific process parameters below are only exemplary, and a person skilled in the art can choose proper values within an appropriate range according to the description, and are not restricted to the specific values shown below.

Example 1

(1) A solution A with a concentration of 0.03 mol/L analytical reagent sodium tungstate dihydrate ($Na_2WO_4 \cdot 2H_2O$) and a solution B with a concentration of 0.03 mol/L cobalt chloride hexahydrate ($CoCl_2 \cdot 6H_2O$) were prepared. Sodium tungstate dihydrate ($Na_2WO_4 \cdot 2H_2O$) was added into deionized water and stirring for 30 minutes to form a uniformly mixed solution A. Cobalt chloride hexahydrate ($CoCl_2 \cdot 6H_2O$) was added into deionized water and stirring for 30 minutes to form a uniformly mixed solution B;

(2) The solution B was drained into the solution A under the action of magnetic stirring, and magnetic stirring was continued for 30 minutes to obtain a uniformly mixed solution C. The molar ratio of sodium tungstate dihydrate ($Na_2WO_4 \cdot 2H_2O$) to cobalt chloride hexahydrate ($CoCl_2 \cdot 6H_2O$) was 1:1;

(3) The solution C was poured into a polytetrafluoroethylene lined high-pressure reactor, and the volume filling ratio was maintained at 40%. The sealed reaction kettle was put into a homogeneous hydrothermal reactor, and the temperature parameter was set to be 160° C. and the reaction time was set to be 24 hours;

(4) After the reaction was completed, the reaction solution was cooled to room temperature, then the final reactants were centrifuged and washed with absolute ethanol and deionized water 3 times respectively. The centrifuged material was dried in a vacuum oven or freeze-drying oven at 50° C. for 5 hours to obtain a powder D;

(5) The powder D was ground in a mortar, and then put into a muffle furnace for calcination at the calcination temperature of 400° C., the heating rate of 5° C./min, and the calcination time of 1 hour to obtain $CoWO_4$ with good crystallinity;

(6) A solution E was prepared containing 0.6 mol/L $CoWO_4$ prepared above and 1 mol/L $WCl_6$. $CoWO_4$ and $WCl_6$ were added sequentially to 40 mL of absolute ethanol and stirred for 30 minutes to form a uniformly mixed solution E. The uniformly mixed solution E was poured into a 100 ml polytetrafluoroethylene lined autoclave, and the volume filling ratio was maintained at 40%;

(7) In a 50 mL beaker, and the foamed nickel was completely immersed with an aspect ratio of 7:1 in acetone, a 4 mol/L HCl solution, deionized water, and absolute ethanol in sequence, and ultrasonic treatment was carried out for 15 minutes, respectively. The processed nickel foam was put into a polytetrafluoroethylene lined autoclave containing the solution E;

(8) The sealed high-pressure reactor was put into the homogeneous hydrothermal reactor, the temperature parameter was set to 160° C., and the reaction time was set to 24 hours;

(9) After the reaction was completed, the reaction solution was cooled to room temperature, and the foamed nickel on which the precursor grew was washed by absolute ethanol and deionized water 3 times, respectively. Then, it was dried in a vacuum oven or freeze-drying oven at 70° C. for 3 hours;

(10) The foamed nickel with the grown precursor was put into a porcelain boat, and calcined in a nitrogen atmosphere at the calcination temperature of 300° C. for 2 hours at the heating rate of 2° C./min to obtain $W_{18}O_{49}$/CoO/$CoWO_4$/NF self-supporting electrocatalytic material. The loading amount of the $W_{18}O_{49}$/CoO/$CoWO_4$ composite material on the foamed nickel was 1.2 mg/cm$^2$. The molar ratio of $W_{18}O_{49}$, $CoWO_4$ and CoO in the $W_{18}O_{49}$/CoO/$CoWO_4$ composite material was 0.18:2:1.

Example 2

(1) A solution A with a concentration of 2 mol/L analytical reagent sodium tungstate dihydrate ($Na_2WO_4.2H_2O$) and a solution B with a concentration of 1 mol/L cobalt nitrate hexahydrate ($Co(NO_3)_2.6H_2O$) were prepared. Sodium tungstate dihydrate ($Na_2WO_4.2H_2O$) was added into deionized water and stirred for 40 minutes to form a uniformly mixed solution A. Cobalt chloride hexahydrate ($CoCl_2.6H_2O$) was added into deionized water and stirred for 40 minutes to form a uniformly mixed solution B;

(2) The solution B was drained into solution A under the action of magnetic stirring, and magnetic stirring was continued for 40 minutes to obtain a uniformly mixed solution C. The molar ratio of sodium tungstate dihydrate ($Na_2WO_4.2H_2O$) to cobalt nitrate hexahydrate ($Co(NO_3)_2.6H_2O$) was 2:1;

(3) The Solution C was poured into a polytetrafluoroethylene lined high-pressure reactor, and the volume filling ratio was maintained at 60%. The sealed reaction kettle was put into a homogeneous hydrothermal reactor, and the temperature parameter was set to be 180° C. and the reaction time was set to be 12 hours;

(4) After the reaction was completed, the reaction solution was cooled to room temperature, then the final reactants were centrifuged and washed with absolute ethanol and deionized water 3 times respectively. The centrifuged material was dried in a vacuum oven or freeze-drying oven at 50° C. for 8 hours to obtain a powder D;

(5) The powder D was ground in a mortar, and then put into a muffle furnace for calcination at the calcination temperature of 500° C., the heating rate of 5° C./min, and the calcination time of 2 hours to obtain $CoWO_4$ with good crystallinity;

(6) A solution E was prepared containing 0.4 mol/L $CoWO_4$ prepared above and 1 mol/L $WCl_6$. $CoWO_4$ and $WCl_6$ were added sequentially to 50 mL of absolute ethanol and stirred for 30 minutes to form a uniformly mixed solution E. The uniformly mixed solution E was poured into a 100 ml polytetrafluoroethylene lined autoclave, and the volume filling ratio was maintained at 50%;

(7) In a 50 mL beaker, the foamed nickel was completely immersed with an aspect ratio of 6:1 in acetone, a 4 mol/L HCl solution, deionized water, and absolute ethanol in sequence, and ultrasonic treatment was carried out for 15 minutes, respectively. The processed nickel foam was put into a polytetrafluoroethylene lined autoclave containing the solution E;

(8) The sealed high-pressure reactor was put into the homogeneous hydrothermal reactor, the temperature parameter was set to 170° C., and the reaction time was set to 8 hours;

(9) After the reaction was completed, the reaction solution was cooled to room temperature, and the foamed nickel on which the precursor grew was washed by absolute ethanol and deionized water 3 times respectively. This was followed by drying in a vacuum oven or freeze-drying oven at 60° C. for 5 hours;

(10) The foamed nickel with the grown precursor was put into a porcelain boat and calcined in a nitrogen atmosphere at the calcination temperature of 350° C. for 2 hours at the heating rate of 3° C./min to obtain $W_{18}O_{49}$/CoO/$CoWO_4$/NF self-supporting electrocatalytic material. The loading amount of the $W_{18}O_{49}$/CoO/$CoWO_4$ composite material on the foamed nickel was 1.8 mg/cm$^2$. The molar ratio of $W_{18}O_{49}$, $CoWO_4$ and CoO in the $W_{18}O_{49}$/CoO/$CoWO_4$ composite material was 0.2:1:1.

Example 3

(1) A solution A with a concentration of 0.8 mol/L analytical reagent sodium tungstate dihydrate ($Na_2WO_4.2H_2O$) and a solution B with a concentration of 0.8 mol/L cobalt chloride hexahydrate ($CoCl_2.6H_2O$) were prepared. Sodium tungstate dihydrate ($Na_2WO_4.2H_2O$) was added into deionized water and stirred for 20 minutes to form a uniformly mixed solution A. Cobalt chloride hexahydrate ($CoCl_2.6H_2O$) was added into deionized water and stirred for 20 minutes to form a uniformly mixed solution B;

(2) The solution B was drained into the solution A under the action of magnetic stirring, and magnetic stirring was continued for 20 minutes to obtain a uniformly mixed solution C. The molar ratio of sodium tungstate dihydrate ($Na_2WO_4.2H_2O$) to cobalt chloride hexahydrate ($CoCl_2.6H_2O$) was 1:1;

(3) The solution C was poured into a polytetrafluoroethylene lined high-pressure reactor, and the volume filling ratio was maintained at 50%. The sealed reaction kettle was put into a homogeneous hydrothermal reactor, the temperature parameter was set to be 200° C., and the reaction time was set to be 6 hours;

(4) After the reaction was completed, the reaction solution was cooled to room temperature, then the final reactants were centrifuged and washed with absolute ethanol and deionized water for 3 times respectively. The centrifuged material was dried in a vacuum oven or freeze-drying oven at 50° C. for 5 hours to obtain a powder D;

(5) The powder D was ground in a mortar, and then put into a muffle furnace for calcination at the calcination temperature of 500° C., the heating rate of 4° C./min, and the calcination time of 1 hour to obtain $CoWO_4$ with good crystallinity;

(6) Solution E was prepared containing 1.8 mol/L $CoWO_4$ prepared above and 3 mol/L $WCl_6$. $CoWO_4$ and $WCl_6$ were added sequentially to 50 mL of absolute ethanol and stirred for 40 minutes to form a uniformly mixed solution E. The uniformly mixed solution E was poured into a 100 ml polytetrafluoroethylene lined autoclave, and the volume filling ratio was maintained at 50%;

(7) In a 50 mL beaker, the foamed nickel was completely immersed with an aspect ratio of 5:1 in acetone, a 3 mol/L HCl solution, deionized water, and absolute ethanol in sequence, and ultrasonic treatment was carried out for 15 minutes, respectively. The processed nickel foam was put into a polytetrafluoroethylene lined autoclave containing the solution E;

(8) The sealed high-pressure reactor was put into the homogeneous hydrothermal reactor, the temperature parameter was set to 150° C., and the reaction time was set to 24 hours;

(9) After the reaction was completed, the reaction solution was cooled to room temperature, and the foamed nickel on which the precursor grew was washed by absolute ethanol and deionized water 3 times respectively. Then, it was dried in a vacuum oven or freeze-drying oven at 70° C. for 3 hours;

(10) The foamed nickel with the grown precursor was put into a porcelain boat, and calcined in a nitrogen atmosphere at the calcination temperature of 400° C. for 2 hours at the heating rate of 2° C./min to obtain $W_{18}O_{49}/CoO/CoWO_4/$ NF self-supporting electrocatalytic material. The loading amount of the $W_{18}O_{49}/CoO/CoWO_4$ composite material on the foamed nickel was 1.9 $mg/cm^2$. The molar ratio of $W_{18}O_{49}$, $CoWO_4$ and CoO in the $W_{18}O_{49}/CoO/CoWO_4$ composite material was 0.19:2:1.

Example 4

(1) A solution A with a concentration of 3 mol/L analytical reagent ammonium metatungstate $(3(NH_4)2O_7WO_3.6H_2O)$ and a solution B with a concentration of 1 mol/L cobalt chloride hexahydrate ($CoCl_2$. $6H_2O$) were prepared. Ammonium metatungstate $(3(NH_4)2O_7WO_3.6H_2O)$ was added into deionized water and stirred for 50 minutes to form a uniformly mixed solution A. Cobalt chloride hexahydrate ($CoCl_2.6H_2O$) was added into deionized water and stirred for 50 minutes to form a uniformly mixed solution B;

(2) The solution B was drained into the solution A under the action of magnetic stirring, and magnetic stirring was continued for 50 minutes to obtain a uniformly mixed solution C. The molar ratio of ammonium metatungstate $(3(NH_4)2O_7WO_3.6H_2O)$ to cobalt chloride hexahydrate ($CoCl_2.6H_2O$) was 3:1;

(3) The Solution C was poured into a polytetrafluoroethylene lined high-pressure reactor, and the volume filling ratio was maintained at 50%. The sealed reaction kettle was put into a homogeneous hydrothermal reactor, the temperature parameter was set to be 150° C., and the reaction time was set to be 36 hours;

(4) After the reaction was completed, the reaction solution was cooled to room temperature, then the final reactants were centrifuged and washed with absolute ethanol and deionized water 3 times respectively. The centrifuged material was dried in a vacuum oven or freeze-drying oven at 50° C. for 5 hours to obtain a powder D;

(5) The powder D was ground in a mortar, and then put into a muffle furnace for calcination at the calcination temperature of 450° C., the heating rate of 5° C./min, and the calcination time of 2 hours to obtain $CoWO_4$ with good crystallinity;

(6) Solution E was prepared containing 2 mol/L $CoWO_4$ prepared above and 3 mol/L $WCl_6$. $CoWO_4$ and $WCl_6$ were added sequentially to 60 mL of absolute ethanol and stirred for 30 minutes to form a uniformly mixed solution E. The uniformly mixed solution E was poured into a 100 ml polytetrafluoroethylene lined autoclave, and the volume filling ratio was maintained at 60%;

(7) In a 50 mL beaker, and the foamed nickel was completely immersed with an aspect ratio of 5:1 in acetone, a 5 mol/L HCl solution, deionized water, and absolute ethanol in sequence, and ultrasonic treatment was carried out for 15 minutes, respectively. The processed nickel foam was put into a polytetrafluoroethylene lined autoclave containing the solution E;

(8) The sealed high-pressure reactor was put into the homogeneous hydrothermal reactor, the temperature parameter was set to 170° C., and the reaction time was set to 3 hours;

(9) After the reaction was completed, the reaction solution was cooled to room temperature, and the foamed nickel on which the precursor grew was washed by absolute ethanol and deionized water for 3 times respectively. Then, it was dried in a vacuum oven or freeze-drying oven at 50° C. for 6 hours;

(10) The foamed nickel with the grown precursor was put into a porcelain boat, and calcined in a nitrogen atmosphere at the calcination temperature of 300° C. for 2 hours at the heating rate of 4° C./min to obtain $W_{18}O_{49}/CoO/CoWO_4/$ NF self-supporting electrocatalytic material. The loading amount of the $W_{18}O_{49}/CoO/CoWO_4$ composite material on the foamed nickel was 2.3 $mg/cm^2$. The molar ratio of $W_{18}O_{49}$, $CoWO_4$ and CoO in the $W_{18}O_{49}/CoO/CoWO_4$ composite material was 0.22:1.8:1.

Example 5

For the preparation process of the self-supporting electrocatalytic material in this Example 5, refer to Example 1. The only difference was that: in step (6), a solution E containing 0.0.2 mol/L of the above-prepared $CoWO_4$ and 1 mol/L of $WCl_6$ was prepared. The loading amount of the $W_{18}O_{49}/CoO/CoWO_4$ composite material on the nickel foam was 0.52 $mg/cm^2$. The molar ratio of $W_{18}O_{49}$, $CoWO_4$ and CoO in the $W_{18}O_{49}/CoO/CoWO_4$ composite material was 0.25:1.5:1.

Example 6

For the preparation process of the self-supporting electrocatalytic material in this Example 6, refer to Example 1. The only difference was that: in step (6), a solution E containing 1 mol/L of the above-prepared $CoWO_4$ and 1 mol/L of $WCl_6$ was prepared. The loading amount of the $W_{18}O_{49}/CoO/CoWO_4$ composite material on the foamed nickel was 3.8 $mg/cm^2$. The molar ratio of $W_{18}O_{49}$, $CoWO_4$, and CoO in the $W_{18}O_{49}/CoO/CoWO_4$ composite material was 0.05:1.5:1.

Comparative Example 1

For the preparation process of the self-supporting electrocatalytic material in this Comparative Example 1, refer to Example 1. The only difference was that: in step (10), the foamed nickel growing with the precursor was placed in a porcelain boat and calcined in a nitrogen atmosphere, and the calcination temperature was 200° C. and the calcination time was 1 hour. The $W_{18}O_{49}$/CoWO$_4$ composite material formed in the obtained self-supporting electrocatalytic material had no CoO phase. The loading amount of the $W_{18}O_{49}$/CoWO$_4$ composite material on the nickel foam was 0.45 mg/cm$^2$. The molar ratio of $W_{18}O_{49}$ to CoWO$_4$ in the $W_{18}O_{49}$/CoWO$_4$ composite material was 0.08:1.

Figure 10:
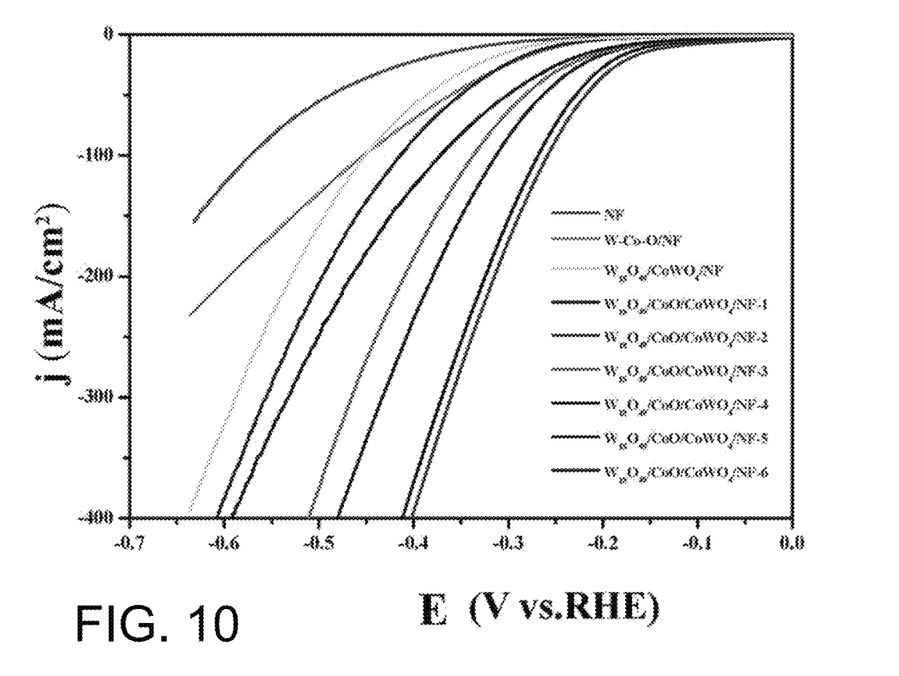
FIG. 10 shows an electrocatalytic hydrogen production performance test diagram of the prepared product.

The self-supporting electrocatalytic materials obtained in Examples 1 to 6 and Comparative Example 1, and the nickel foam growing with the precursor (denoted as W—Co—O/NF) obtained in Comparative Example 1 were respectively placed in 1M KOH alkaline electrolyte to carry out hydrogen production electrocatalysis test. The performance of electrocatalysis hydrogen and oxygen production adopts CHI660B electrochemical workstation of Shanghai Chenhua Instrument Co., Ltd. to collect data, and a three-electrode system, saturated calomel electrode (saturated KCl filling) as the reference electrode, and carbon rod as the counter electrode. The obtained self-supporting electrocatalysts were used as working electrodes. 1M KOH was used as the electrolyte. The sweep rate of the linear sweep voltammetry (LSV) curve was 2 mV/s. Referring to FIG. 10, when the current density was 100 mA/cm$^2$, the required hydrogen production overpotentials of NF (pure foamed nickel), $W_{18}O_{49}$/COO/CoWO$_4$/NF-1, $W_{18}O_{49}$/CoO/CoWO$_4$/NF-2, $W_{18}O_{49}$/CoO/CoWO$_4$/NF-3, $W_{18}O_{49}$/CoO/CoWO$_4$/NF-4, $W_{18}O_{49}$/CoO/CoWO$_4$/NF-5, $W_{18}O_{49}$/CoO/CoWO$_4$/NF-6, precursors-grown foamed nickel in Comparative Example 1, and $W_{18}O_{49}$/CoWO$_4$/NF were 570 mV, 268 mV, 254 mV, 340 mV, 314 mV, 410 mV, 380 mV, 451 mV, and 451 mV.

Figure 11:
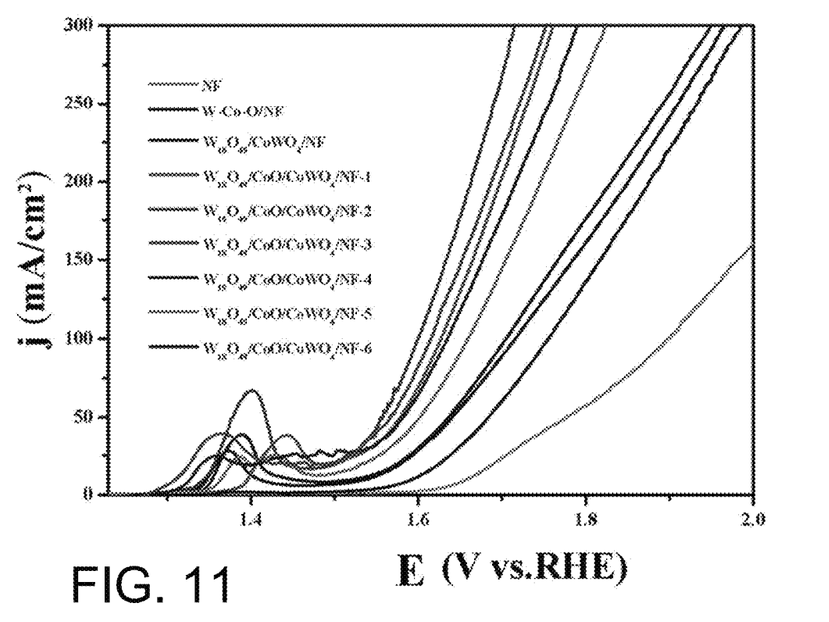
FIG. 11 shows an electrocatalytic oxygen production performance test diagram of the prepared product.
Figure 12:
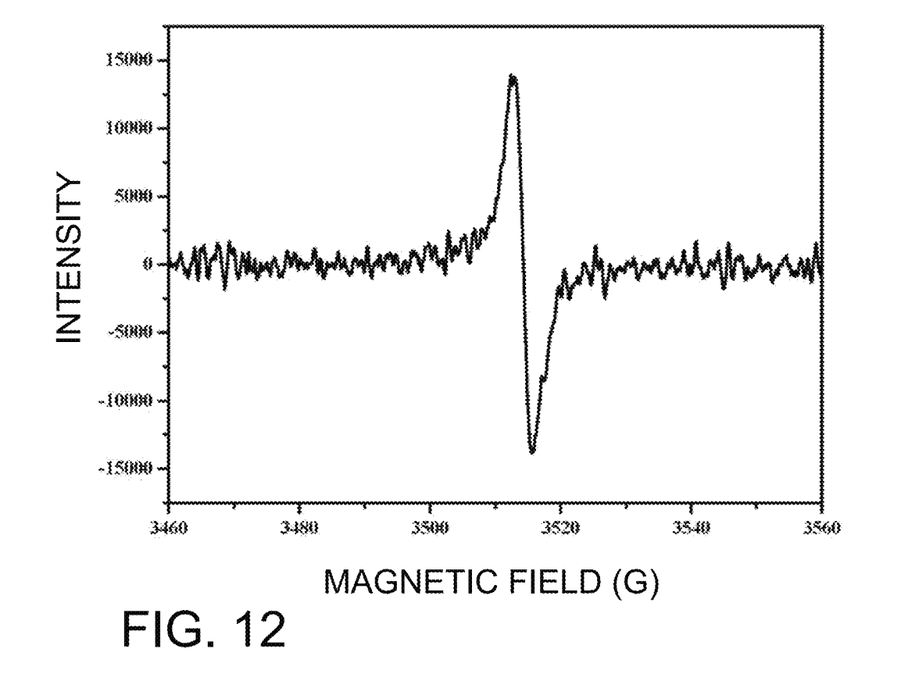
FIG. 12 shows an EPR (oxygen vacancy) spectrum of the prepared $W_{18}O_{49}$/CoO/CoWO$_4$/NF-6.

The self-supporting electrocatalytic materials obtained in Examples 1 to 6 and Comparative Example 1 were respectively placed in 1M KOH alkaline electrolyte to carry out oxygen production electrocatalytic test. As shown in FIG. 11, when the current density was 100 mA/cm$^2$, the required hydrogen production overpotentials of NF (pure foamed nickel), $W_{18}O_{49}$/CoO/CoWO$_4$/NF-1, $W_{18}O_{49}$/CoO/CoWO$_4$/NF-2, $W_{18}O_{49}$/CoO/CoWO$_4$/NF-3, $W_{18}O_{49}$/CoO/CoWO$_4$/NF-4, $W_{18}O_{49}$/CoO/CoWO$_4$/NF-5, $W_{18}O_{49}$/CoO/CoWO$_4$/NF-6, precursors-grown foamed nickel (referred as: W—Co—O/NF) in Comparative Example 1, and $W_{18}O_{49}$/CoWO$_4$/NF respectively were 630 mV, 390 mV, 370 mV, 380 mV, 400 mV, 430 mV, 470 mV, 530 mV, and 480 mV.

Figure 1:
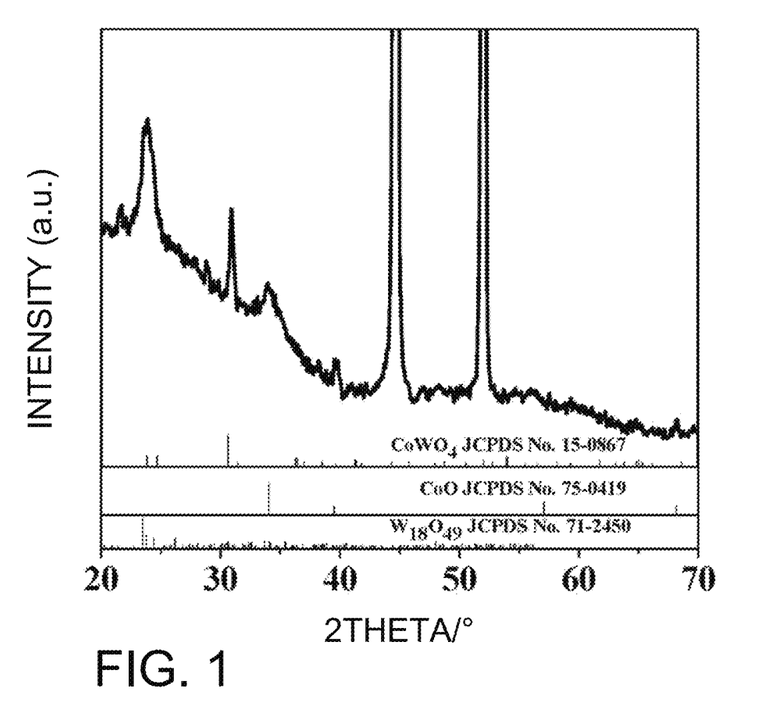
FIG. 1 shows an X-ray diffraction (XRD) pattern of the $W_{18}O_{49}$/CoO/CoWO$_4$/NF self-supporting electrocatalytic material prepared in Example 1.

FIG. 1 shows the XRD pattern of the $W_{18}O_{49}$/CoO/CoWO$_4$/NF self-supporting electrocatalytic material prepared in Example 1, and it can be seen from the figure that the diffraction peaks at the 2θ value of 44.5° and 51.9° respectively correspond to the (111) and (200) crystal planes of the foamed nickel (JCPDS card No. 70-0989), and the strong diffraction peak at the 2θ value of 44.5° corresponds to the (010) crystal plane of the monoclinic phase $W_{18}O_{49}$ (JCPDS Card No. 71-2450). The diffraction peaks at the 2θ value of 34.10° and 39.58° correspond to the (111) and (200) crystal planes of cubic CoO (JCPDS Card No. 75-0419), and the strong diffraction peak at the 2θ value of 30.63° corresponds to the (–111) crystal plane of the monoclinic CoWO$_4$ (JCPDS Card No. 15-0867), indicating successful synthesis of $W_{18}O_{49}$/CoO/CoWO$_4$/NF material.

Figure 2:
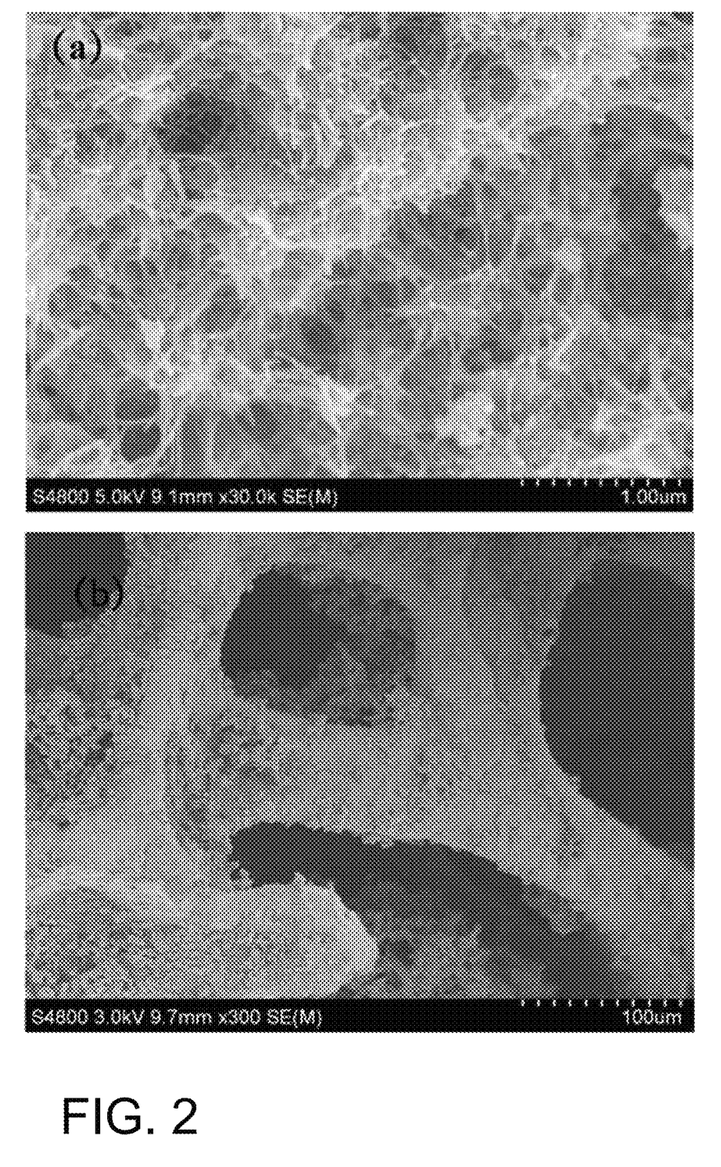
FIG. 2 shows a scanning electron microscope (SEM) image of the $W_{18}O_{49}$/CoO/CoWO$_4$/NF self-supporting electrocatalytic material prepared in Example 1.
Figure 3:
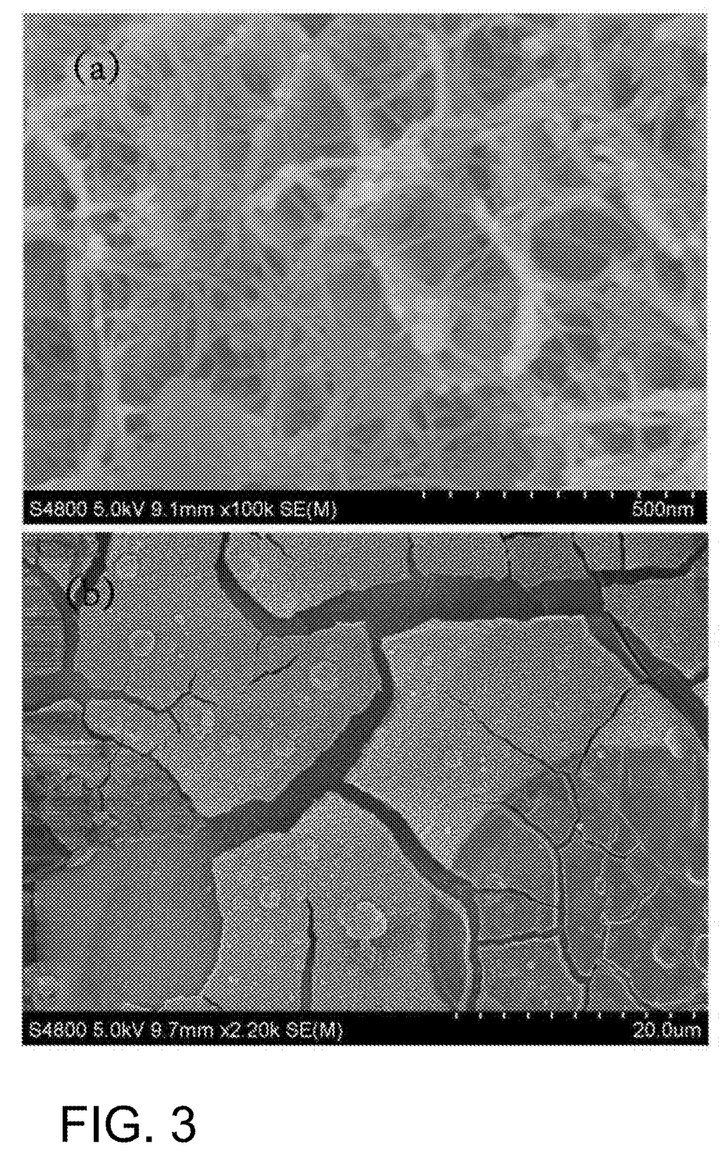
FIG. 3 shows an SEM image of the $W_{18}O_{49}$/CoO/CoWO$_4$/NF self-supporting electrocatalytic material prepared in Example 5.
Figure 4:
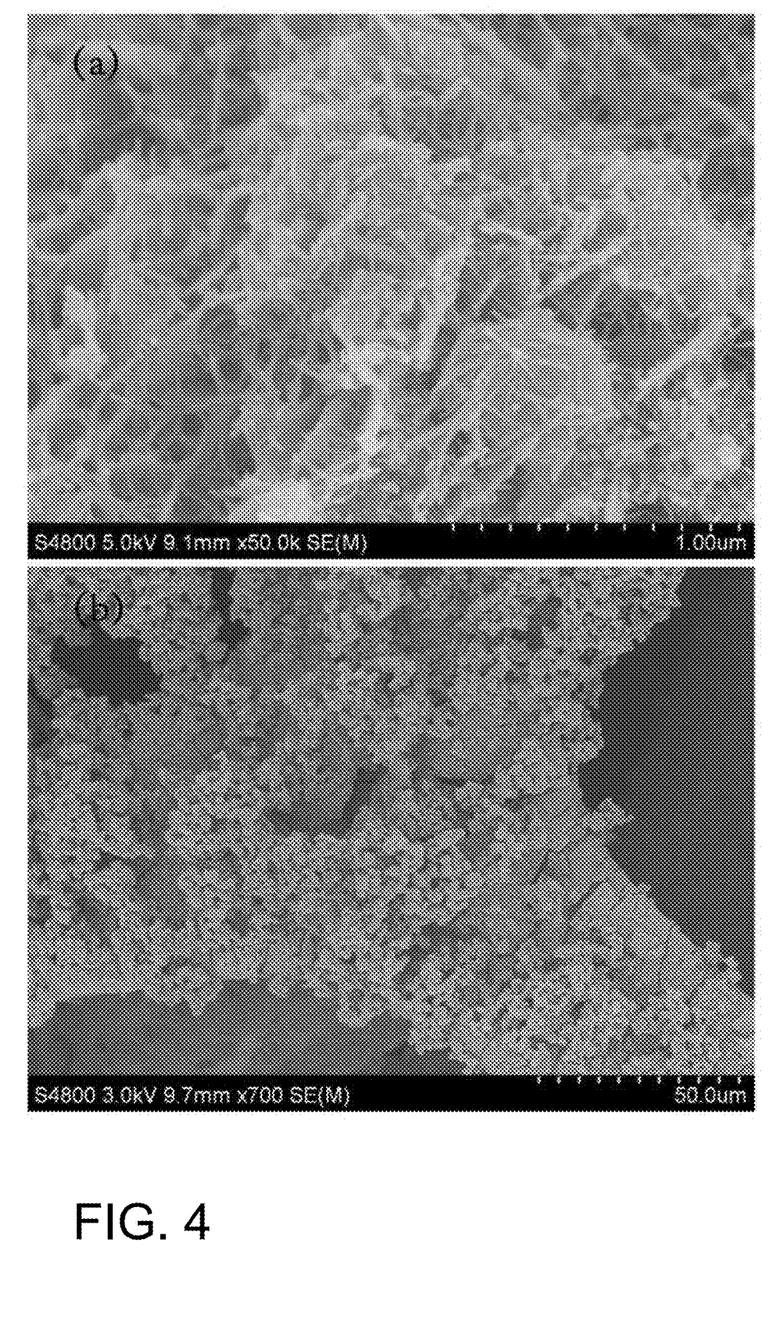
FIG. 4 shows an SEM image of the $W_{18}O_{49}$/CoO/CoWO$_4$/NF self-supporting electrocatalytic material prepared in Example 6.
Figure 5:
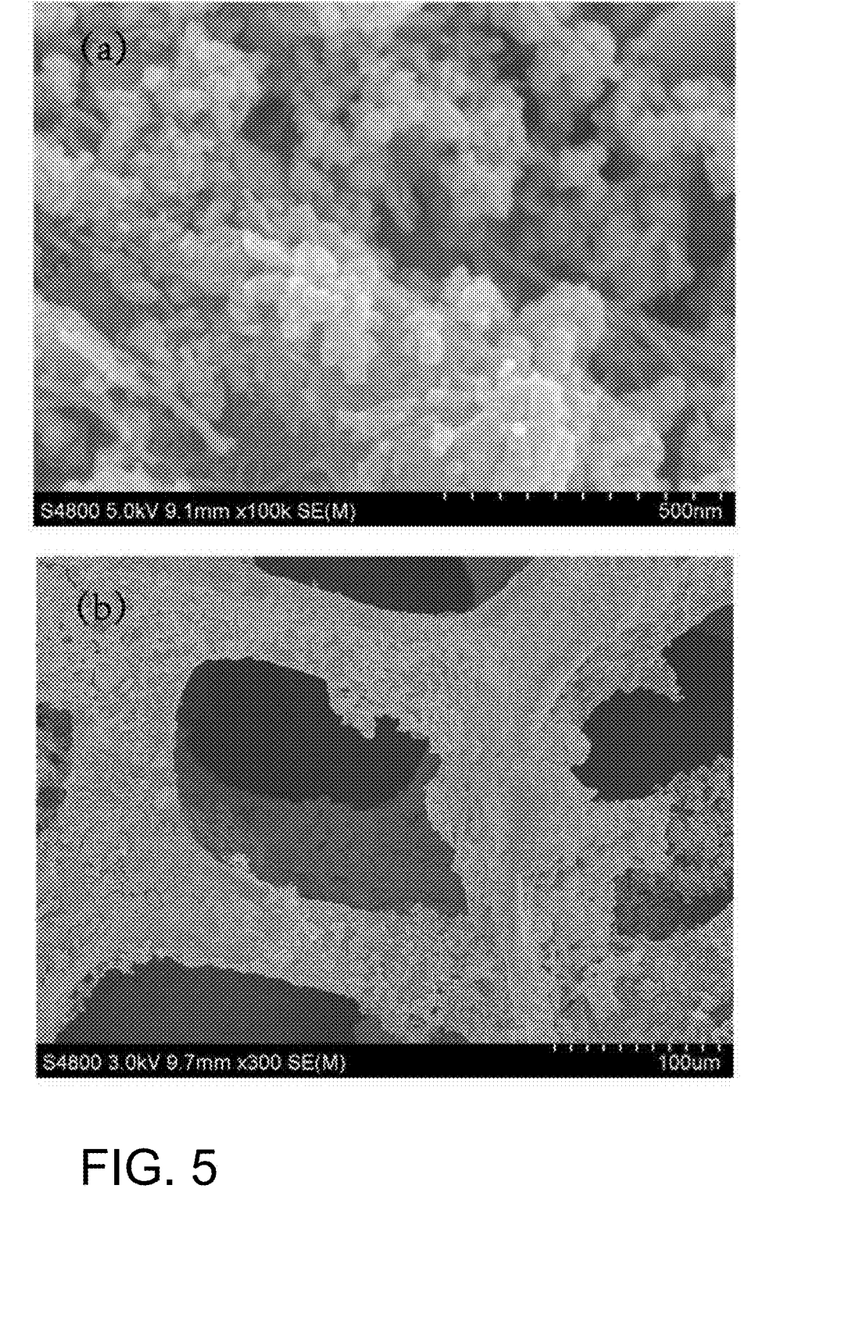
FIG. 5 shows an SEM image of the $W_{18}O_{49}$/CoO/CoWO$_4$/NF self-supporting electrocatalytic material prepared in Comparative Example 1.

FIG. 2 shows the $W_{18}O_{49}$/CoO/CoWO$_4$/NF-1 self-supporting electrocatalytic material prepared in Example 1. The nanowires are attached to the surface of the nanosheets and are connected to each other to form a network structure. The composite material is uniformly and tightly distributed on the foamed nickel. FIG. 3 shows the $W_{18}O_{49}$/CoO/CoWO$_4$/NF-5 self-supporting electrocatalytic material prepared in Example 5. It can be seen that the nanowires are attached to the nanosheets, and compared with Example 1, the loading capacity is small after the ratio is adjusted, the growth of the product on the foamed nickel is not completely covered, and signs of shedding appear; FIG. 4 shows the $W_{18}O_{49}$/CoO/CoWO$_4$/NF-6 self-supporting electrocatalytic material prepared in Example 6, which has a nano-sheet intercalated nano-wire structure, it can be seen that, compared with Example 1, the loading amount is higher after the proportion is adjusted, the product completely covers on the foamed nickel, and a large number of clustering phenomenon occurs, so that cracks occur on the surface of the foamed nickel, and a peeling sign appears; FIG. 5 shows the precursor-grown nickel foam prepared in Comparative Example 1 (referred as: W—Co—O/NF), which is in the form of nanoparticles with non-uniform size.

Figure 6:
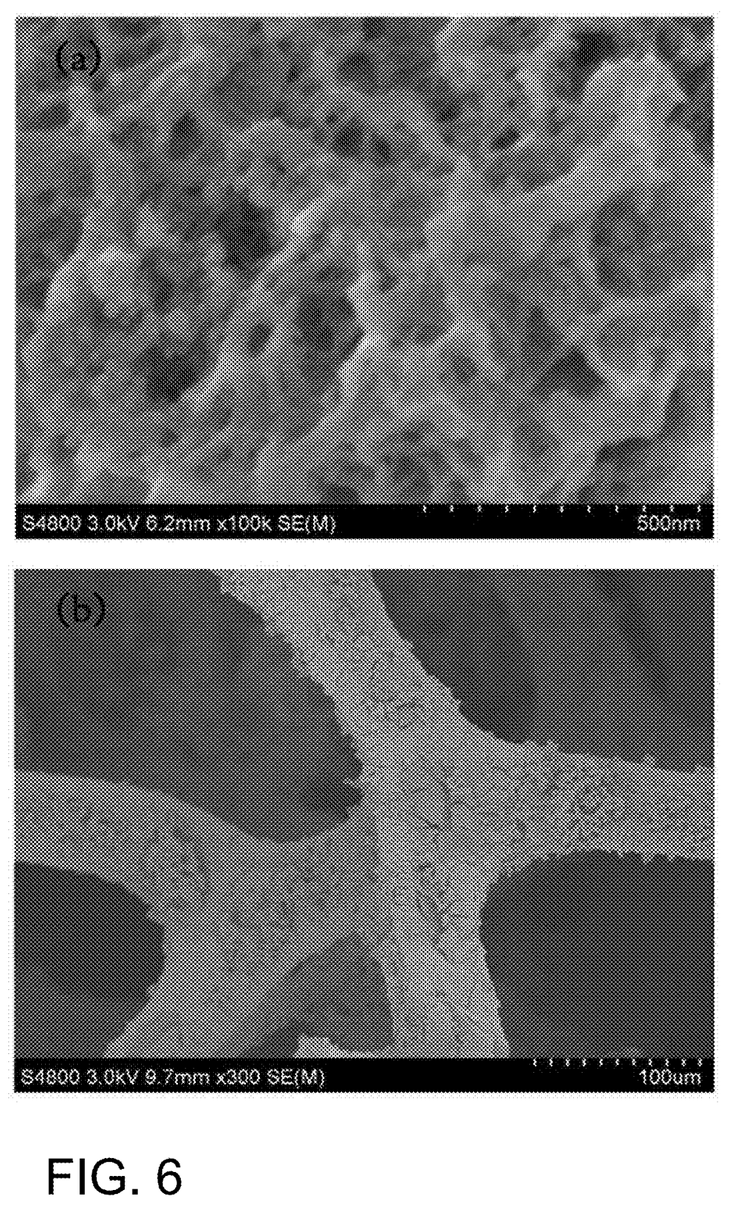
FIG. 6 shows an SEM photograph of the precursor-grown foamed nickel prepared in Comparative Example 1 (referred as: W—Co—O/NF)
Figure 7:
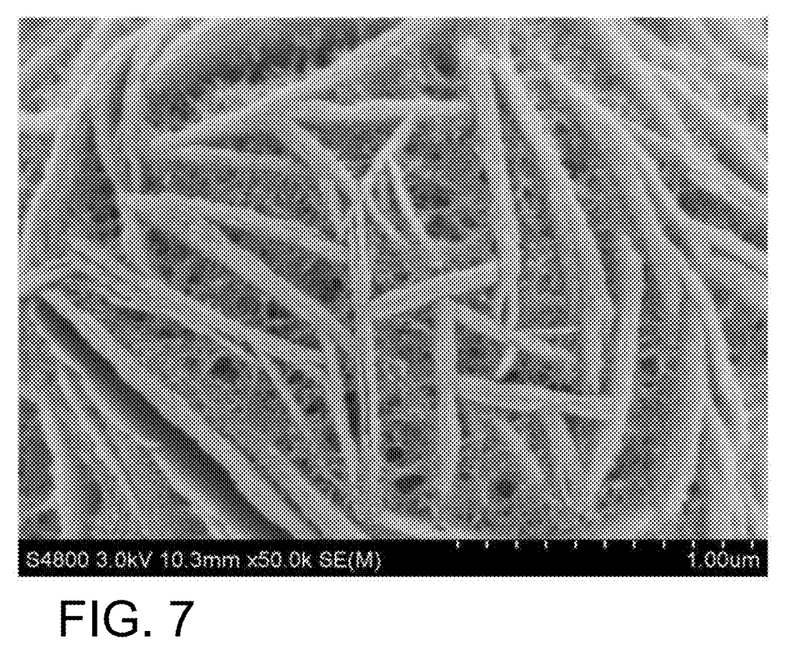
FIG. 7 shows an SEM photograph of the $W_{18}O_{49}$/CoO/CoWO$_4$/NF self-supporting electrocatalytic material prepared in Example 2.
Figure 8:
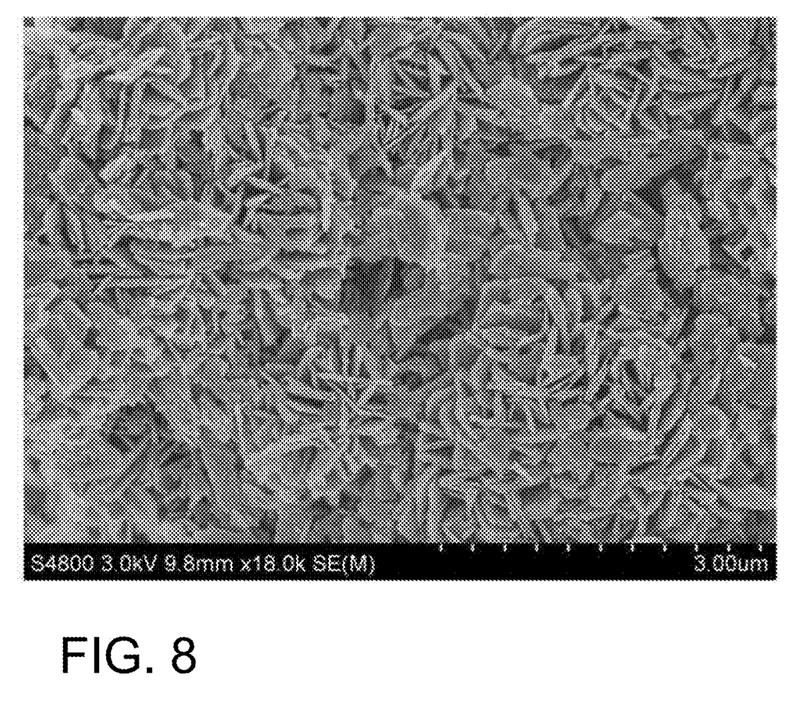
FIG. 8 shows an SEM photo of the $W_{18}O_{49}$/CoO/CoWO$_4$/NF self-supporting electrocatalytic material prepared in Example 3.
Figure 9:
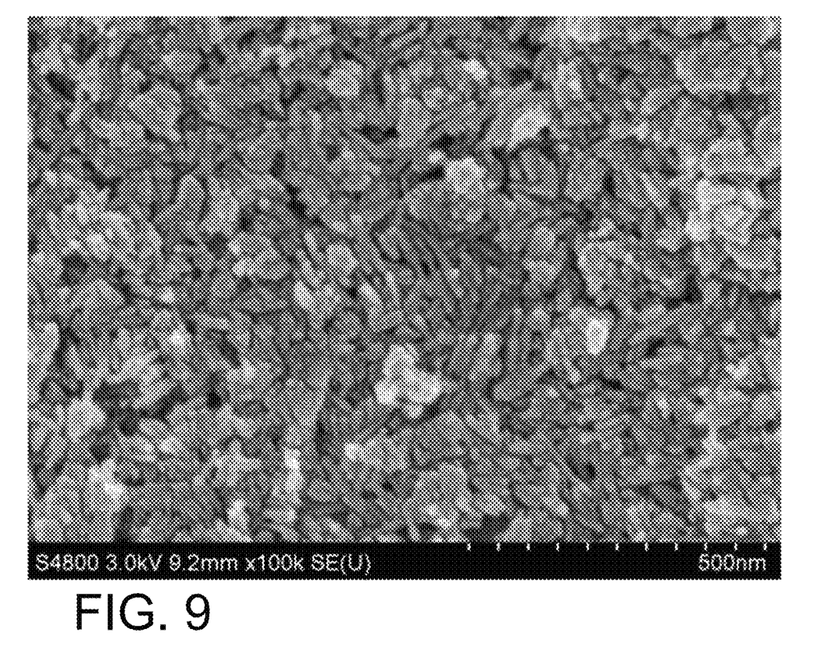
FIG. 9 shows an SEM photo of the $W_{18}O_{49}$/CoO/CoWO$_4$/NF self-supporting electrocatalytic material prepared in Example 4.

FIG. 6 shows an SEM photograph of $W_{18}O_{49}$/CoWO$_4$/NF prepared in Comparative Example 1. It can be seen that two morphologies, $W_{18}O_{49}$ nanowire and $W_{18}O_{49}$ nanoparticle, exist in the product. The $W_{18}O_{49}$/CoO/CoWO$_4$/NF self-supporting electrocatalytic material of nanowire-attached nanosheet structure, nanosheet-incorporated nanowire structure, and nano-sheet structure and nano-particle structure were obtained under the conditions of Example 1 (FIG. 2), Example 2 (FIG. 7), Example 3 (FIG. 8) and Example 4 (FIG. 9), respectively. Among them, the morphology of the product obtained in Example 2 is that CoO/CoWO$_4$ composite nanosheets and $W_{18}O_{49}$ nanowires coexist, the $W_{18}O_{49}$ nanowires are distributed among the gaps of the CoO/CoWO$_4$ composite nanosheets. The diameter of the $W_{18}O_{49}$ nanowires is about 10 to 20 nm.

The invention claimed is:

1. A $W_{18}O_{49}$/CoO/CoWO$_4$/NF self-supporting electrocatalytic material, comprising:
   a foamed nickel substrate; and
   a $W_{18}O_{49}$/CoO/CoWO$_4$ composite material formed in-situ on a foamed nickel substrate.

2. The $W_{18}O_{49}$/CoO/CoWO$_4$/NF self-supporting electrocatalytic material according to claim 1, wherein a total loading amount of the $W_{18}O_{49}$/CoO/CoWO$_4$ composite material on the foamed nickel is 0.5 to 4 mg/cm$^{-2}$.

3. The $W_{18}O_{49}$/CoO/CoWO$_4$/NF self-supporting electrocatalytic material according to claim 1, wherein the molar ratio of $W_{18}O_{49}$, CoWO$_4$ and CoO in the $W_{18}O_{49}$/CoO/CoWO$_4$ composite material is (0.05 to 0.25):(1.5 to 4):1.

4. The $W_{18}O_{49}$/CoO/CoWO$_4$/NF self-supporting electrocatalytic material according to claim 1, wherein the $W_{18}O_{49}$/CoO/CoWO$_4$ composite material is CoO/CoWO$_4$ composite nanosheets and $W_{18}O_{49}$ nanowires distributed among the CoO/CoWO$_4$ composite nanosheets.

5. The $W_{18}O_{49}$/CoO/CoWO$_4$/NF self-supporting electrocatalytic material according to claim 4, wherein the thickness of the CoO/CoWO$_4$ composite nanosheets is less than or equal to 100 nm, the diameter of the $W_{18}O_{49}$ nanowires is 5 to 20 nm, and the length of the $W_{18}O_{49}$ nanowires is less than or equal to 100 nm.

6. A preparation method of the $W_{18}O_{49}$/CoO/CoWO$_4$/NF self-supporting electrocatalytic material according to claim 1, comprising:
   (1) dissolving CoWO$_4$ and WCl$_6$ in a solvent to obtain a first solution;
   (2) immersing the foamed nickel in an autoclave containing the first solution, and then reacting at 120 to 200° C. for 3 to 36 hours, taking out the foamed nickel, washing, and drying to obtain the foamed nickel with a precursor growing thereon; and (3) calcining the foamed nickel with the precursor grown at 400 to 500° C. in a nitrogen atmosphere to obtain the $W_{18}O_{49}$/CoO/CoWO$_4$/NF self-supporting electrocatalytic material.

7. The preparation method according to claim 6, wherein the concentration of CoWO$_4$ in the first solution is 0.01 to 5 mol/L and the concentration of WCl$_6$ in the first solution is 0.01 to 5 mol/L.

8. The preparation method according to claim 7, wherein the molar ratio of CoWO$_4$ and WCl$_6$ is (0.2 to 1):1.

9. The preparation method according to claim 6, wherein the preparation method of CoWO$_4$ comprises:

(1) dissolving a tungsten source and a cobalt source with a molar ratio of (0.1 to 3):1 in water to obtain a second solution;

(2) reacting the second solution at 150 to 200° C. for 5 to 36 hours, and then centrifuging, washing, and drying to obtain a powder; and (3) calcining the powder at 400 to 500° C. to obtain the CoWO$_4$.

10. The preparation method according to claim 9, wherein the tungsten source is selected from at least one of sodium tungstate, ammonium tungstate, and tungsten isopropoxide, and the cobalt source is selected from at least one of cobalt chloride, cobalt nitrate, cobalt oxalate, and cobalt acetate.

11. The preparation method according to claim 6, wherein the volume filling ratio of the autoclave containing the first solution is 20 to 70%.

12. The preparation method according to claim 6, wherein the temperature rise rate of the calcination is 2 to 5° C./min and the calcining time is 1 to 4 hours.

* * * * *